United States Patent [19]
Grill et al.

[11] Patent Number: 6,049,443
[45] Date of Patent: Apr. 11, 2000

[54] SUSPENSION BENT BY STRESSED PATCH

[75] Inventors: Alfred Grill, White Plains, N.Y.; Michael Anthony Moser, San Jose, Calif.; Vishnubhai Vitthalbhai Patel, Yorktown Hts., N.Y.; Clinton David Snyder, Los Gatos; Celia E. Yeack-Scranton, deceased, late of San Jose, both of Calif., by Robert A. Scranton, legal representative

[73] Assignee: International Business Machines Corporation, Armonk, N.Y.

[21] Appl. No.: 09/281,208

[22] Filed: Mar. 30, 1999

Related U.S. Application Data

[62] Division of application No. 08/798,864, Feb. 11, 1997, Pat. No. 5,859,105, which is a continuation of application No. 08/474,616, Jun. 7, 1995, Pat. No. 5,663,854.

[51] Int. Cl.[7] .................................................. G11B 5/48
[52] U.S. Cl. ........................................................ 360/104
[58] Field of Search ....................................... 360/104–106

[56] References Cited

U.S. PATENT DOCUMENTS

| | | | |
|---|---|---|---|
| 4,268,880 | 5/1981 | Majima | 360/109 |
| 4,326,228 | 4/1982 | Sakamoto | 360/109 |
| 4,734,805 | 3/1988 | Yamada et al. | 360/104 |
| 5,047,883 | 9/1991 | Aldrich et al. | 360/109 |
| 5,103,361 | 4/1992 | Nagatsuka et al. | 360/109 |
| 5,189,578 | 2/1993 | Mori et al. | 360/106 |
| 5,408,373 | 4/1995 | Bajorek et al. | 360/104 |
| 5,440,437 | 8/1995 | Sanada et al. | 360/545 |
| 5,454,158 | 10/1995 | Fontana, Jr. et al. | 29/603 |
| 5,461,525 | 10/1995 | Christianson et al. | 360/104 |
| 5,471,734 | 12/1995 | Hatch et al. | 29/360 |
| 5,486,963 | 1/1996 | Jones, Jr. | 360/104 |
| 5,507,987 | 4/1996 | Windischmann | 264/81 |

FOREIGN PATENT DOCUMENTS

| | | |
|---|---|---|
| 36 187 | 9/1981 | European Pat. Off. . |
| 84-251729/41 | 10/1984 | European Pat. Off. . |

(List continued on next page.)

OTHER PUBLICATIONS

Anonymous, "Dynamic Head/Suspension Assembly Preload Adjustment", *Research Disclosure*, 2655, Jun. 1986.

(List continued on next page.)

*Primary Examiner*—Allen T. Cao
*Attorney, Agent, or Firm*—Gray Cary Ware Freidenrich

[57] ABSTRACT

The present invention provides a prebent ceramic suspension which includes a ceramic load beam which is bent by a stress patch. With thin film techniques the stress patch is formed on top of the load beam. In the preferred embodiment the patch is amorphous hydrogenated diamond-like carbon. When the suspension is on a wafer the carbon patch exerts a compressive stress on a top surface of the load beam just under the patch. When the suspension is released from the wafer the compressive patch exerts tensile forces on the top surface of the load beam causing an end of the load beam to bend toward the wafer. The amount of bending of the suspension can be accurately controlled by the cross sections of the load beam and the patch as well as the lateral dimensions of the patch. Further control can be achieved by controlling the hydrogen, nitrogen and other additive components of the carbon patch. After fabrication bending can be lessened by machining portions of the patch with a laser beam to effectively negate the stress of these portions. Still further, the patch can be laterally configured so that the suspension forms an arc when preloaded on a disk During fabrication various layers can be formed by thin film deposition to form an integrated magnetic head-slider-suspension. A pair of prebent ceramic suspensions can be preloaded on adjacent magnetic disks by a single actuator arm.

7 Claims, 7 Drawing Sheets

FOREIGN PATENT DOCUMENTS

| | | |
|---|---|---|
| 487914-A2 | 10/1991 | European Pat. Off. . |
| 55-122227 | 9/1980 | Japan . |
| 57-167162 | 10/1982 | Japan . |
| 59-168968 | 9/1984 | Japan . |
| 60-127577 | 7/1985 | Japan . |
| 60-187920 | 9/1985 | Japan . |
| 61-16076 | 1/1986 | Japan . |
| 61-979 | 1/1986 | Japan . |
| 61-148681 | 7/1986 | Japan . |
| 61-182684 | 8/1986 | Japan . |
| 61-283082 | 12/1986 | Japan . |
| 62-289981 | 12/1987 | Japan . |
| 62-291765 | 12/1987 | Japan . |
| 1-248372 | 10/1989 | Japan . |
| 3-95776 | 4/1991 | Japan . |
| 3-1259467 | 11/1991 | Japan . |
| 3-248308 | 11/1991 | Japan . |
| 3-278382 | 12/1991 | Japan . |
| 4-11319 | 1/1992 | Japan . |
| 4-85772 | 3/1992 | Japan . |
| 4-188478 | 7/1992 | Japan . |
| 4-345978 | 12/1992 | Japan . |
| 6-76514 | 3/1994 | Japan . |
| 60-157714 | 8/1995 | Japan . |

OTHER PUBLICATIONS

Grill et al., "Diamondlike carbon films by rf plasma–assisted chemical vapor deposition from acetylene", *IBM Journal of Research and Development,* vol. 34, No. 6, Nov. 1990, pp. 849–857.

Grill et al., "The Effect of Deposition Conditions on Optical and Tribological Properties of Annealed Diamond–Like Carbon Films", *Diamond and Diamond–Like Films and Coatings,* Plenum Press, NY 1991, p.417–426.

Grill et al, "Diamondlike Carbon Deposited by DC PACVD", *Diamond Films and Technology,* vol. 1, No. 4, 1992, p.219–233.

Grill et al, "Nitrogen–Containing Diamondlike Carbon Prepared by DC PACVD", *Diamond Films and Technology,* vol. 2, Nos. 2 & 3, 1992, p. 61–73.

Grill et al, "Stresses in diamond–like carbon films", *Diamond and Related Materials,* 2 (1993), p. 1519–1524.

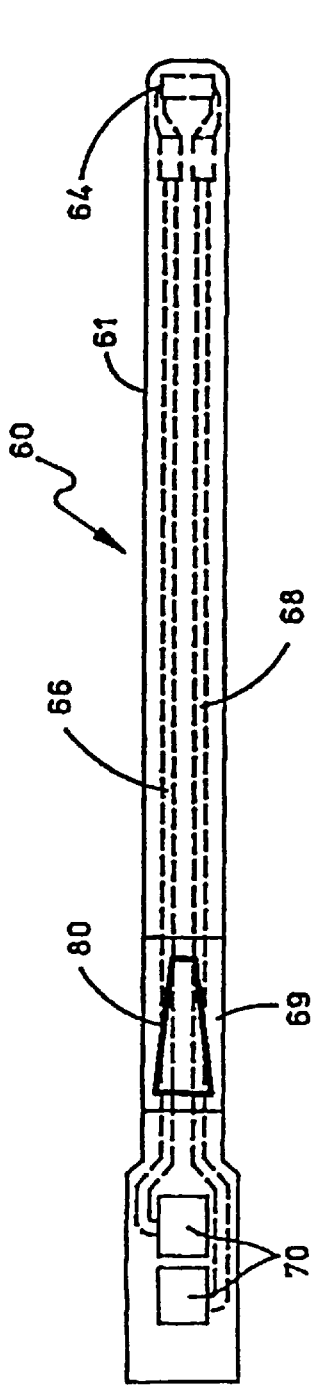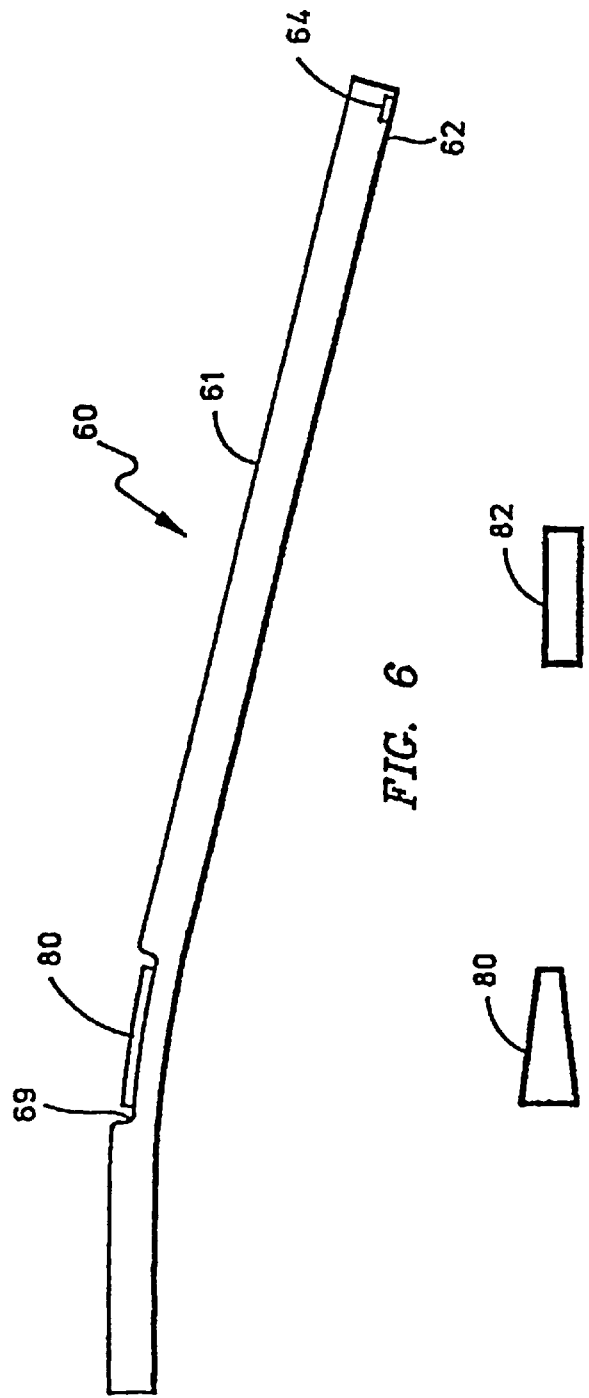

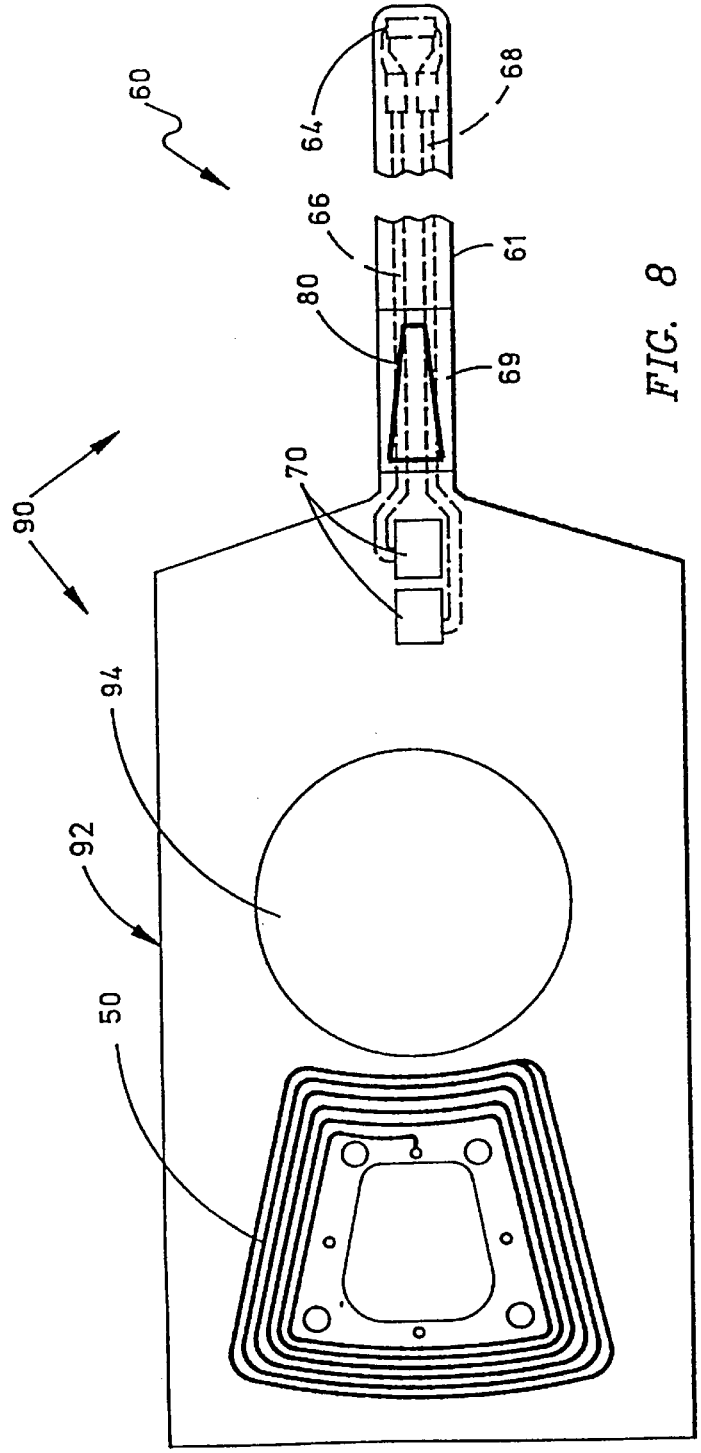
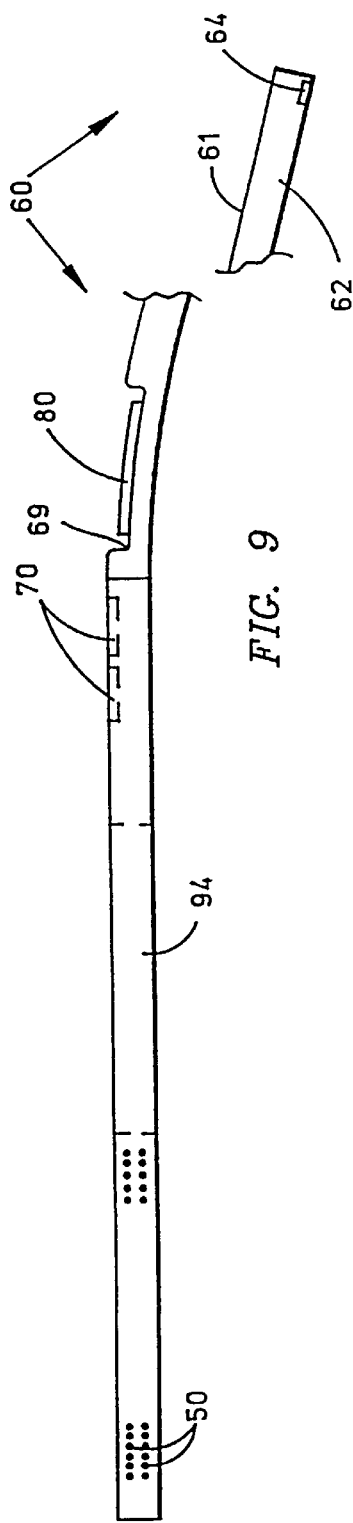
FIG. 8
FIG. 9

SUSPENSION BENT BY STRESSED PATCH

CROSS REFERENCE TO RELATED APPLICATION

This application is a divisional application of application Ser. No. 08/798,864 filed Feb. 11, 1997 U.S. Pat. No. 5,859,105 which is a continuation application of application Ser. No. 08/474,616 filed Jun. 7, 1995, U.S. Pat. 5,663,854.

CROSS-REFERENCE TO RELATED PATENTS AND PATENT APPLICATIONS

This application is related to:

(1) U.S. Pat. No. 4,167,765 by Watrous for "TRANSDUCER SUSPENSION MOUNT APPARATUS";

(2) U.S. Pat. No. 4,670,804 by Kant et al. for "EXPANDABLE SUSPENSION FOR A READ/WRITE HEAD IN A DISK FILE";

(3) U.S. Pat. No. 4,286,297 by Root et al. for "SUSPENSION FOR FLYING MAGNETIC HEAD";

(4) U.S. Pat. No. 4,141,049 by Watrous for "LOADING MECHANISM FOR NEGATIVE PRESSURE SLIDERS"; and (5) Patent Application for "INTEGRATED SUSPENSION, ACTUATOR ARM AND COIL ASSEMBLY" by Fontana et al., Ser. No. 08.366,282.

The aforementioned patents and patent applications are commonly assigned to IBM and are incorporated by reference herein.

BACKGROUND OF THE INVENTION

1. Field of the Invention

The present invention relates to a prebent ceramic suspension and more particularly to an integrated suspension-slider-magnetic head for a multiple disk magnetic disk drive.

2. Description of the Related Art

A magnetic disk drive includes a magnetic disk and a magnetic head. When the disk is rotated the magnetic head reads and writes magnetic signals on circular tracks on the disk. The magnetic head is typically mounted to a slider which is, in turn, mounted to a suspension (load beam), the suspension biasing the slider toward the disk which is referred to in the art as "preloading." The suspension is mounted to an actuator arm of an actuator, the actuator being a voice coil or a longitudinal solenoid depending upon whether the circular tracks of the disk are accessed radially or longitudinally. Both types of actuators employ an electromagnet. If the actuator is a voice coil the actuator arm carries a coil which, upon selective energization, cooperates with the electromagnet to move the slider radially across the magnetic disk to desired tracks.

In a quiescent state of the disk drive the suspension preloads the slider on the magnetic disk. When the magnetic disk is rotated the disk swirls air between the disk and the slider producing a hydrodynamic layer which separates the slider from the surface of the disk. When this occurs the slider and the magnetic head literally "fly" above or below the surface of the disk. The cushion of air is referred to as an "air bearing" and the surface of the slider riding on the air bearing is referred to as an "air bearing surface" (ABS).

In a high capacity disk drive multiple double sided disks are vertically stacked and are I—read and written by multiple magnetic heads, the multiple magnetic heads being mounted to multiple sliders, the multiple sliders being mounted to multiple suspensions and the multiple suspensions being mounted to multiple actuator arms. A pair of suspensions are mounted to a single actuator arm and the suspensions are positioned between adjacent disks in the stack. With this arrangement one magnetic head reads and writes on the bottom of one disk and the other magnetic head reads and writes on the top of the other disk.

A typical prior art suspension is made from metal which is bent in a plastic state to bias the slider toward the disk. The slider, which carries the magnetic head, is bonded to one end of the suspension and the other end of the suspension is affixed to one end of the actuator arm. The attachment of the slider to the suspension and the attachment of the suspension to the actuator arm is a labor intensified job. The sliders are referred to as "chiplets" because they are small and are fabricated by thin film technology. Each chiplet has to be accurately bonded to the suspension within a close tolerance. In order to simplify fabrication of these disk drive components it has been proposed to construct are integrated magnetic head-slider-suspension by thin film technology. The slider and the suspension are constructed of a ceramic, typically alumina. A copending patent application Ser. No. 08/166,282, filed Dec. 29, 1994, commonly assigned to IBM goes one step further and proposes constructing an integrated magnetic head-slider-suspension-actuator arm. The advantage of integrating these components is that they are connected with precision. With thin film batch construction literally hundreds of integrated units can be made on a single wafer.

In thin film construction multiple thin film layers are formed by photopatterning, plating and sputtering on a wafer. When the construction is completed the integrated units are released from the wafer, each integrated unit being an integrated magnetic head-slider-suspension. All of these units are flat. The integrated magnetic head-slider-suspension is then attached to an actuator arm. In order to bias the slider toward a disk one end of the suspension is attached to a slanted surface on the actuator arm. With this arrangement an actuator arm is employed with each suspension which results in two actuator arms being employed between adjacent disks. This decreases disk stacking density as compared to the prior art single actuator arm which carries two prebent metallic suspensions. There is a strong felt need to capitalize on the benefits of integrated magnetic head-slider-suspensions without losing disk stacking density in a multiple disk drive.

SUMMARY OF THE INVENTION

The present invention provides a prebent ceramic suspension which includes a stress patch on a ceramic load beam. A pair of prebent ceramic suspensions can be connected to a single actuator arm in the same manner that a pair of prior art prebent metallic suspensions are attached to a single actuator arm. Prebent ceramic suspensions can provide the same disk stack density as the prior art prebent metallic suspensions with the additional advantage that the magnetic head, the slider, the suspension and optionally the actuator arm can be integrated. In the fabrication of the integrated unit various layers are formed on a wafer. These layers form the load beam and the slider, which are typically alumina, and the magnetic head, which is a combination of magnetic layers and insulation layers. After completing these layers a stress layer, which has a lateral patch configuration, is formed on top of the load beam near the actuator arm. The integrated unit is flat before it is released from the wafer and the patch stresses a top surface of the load beam just under the patch. In the preferred embodiment the patch is amorphous hydrogenated diamond-like carbon. Before release of the integrated unit from the wafer the carbon patch exerts compressive stress on the top surface of the load beam just under the patch. When the integrated unit is released from the wafer the compressive patch causes the load beam, which carries the magnetic head, to bend toward the wafer. The amount of bending of the load beam can be accurately controlled by the cross sections of the load beam and the patch. The patch can be laterally configured so that the load beam forms an arc when loaded by the disk. Further control can be achieved by controlling the hydrogen, nitrogen and other additive components of the carbon patch. Even after fabrication bending can be lessened by machining portions of the patch with a laser beam to effectively negate the stress of these portion.

An object of the present invention is to provide ceramic suspensions which can provide the same disk stack density as prior art metallic suspensions but which have an additional advantage of integration with a magnetic head and slider by thin film deposition.

Another object is to provide a prebent ceramic suspension which enables two prebent suspensions to be loaded on adjacent magnetic disks by a single actuator arm.

A further object is to provide an integrated magnetic head-slider-suspension and optionally integrated actuator arm with the suspension prebent to provide desired preloading when contacting a magnetic disk.

Still another object is to provide an integrated prebent ceramic suspension apparatus which has precisely placed magnetic head components and which precisely preloads a slider on a magnetic disk.

Still a further object is to provide a method of making the prebent ceramic suspension apparatus of the present invention.

Other objects and attendant advantages of the present invention will be readily apparent to one skilled in the art upon reading the following description taken together with the accompanying drawings.

BRIEF DESCRIPTION OF THE PREFERRED EMBODIMENTS

FIG. 5 is a top plan illustration of the prebent ceramic suspension integrated with a magnetic head slider and leads.

FIG. 6 is a side illustration of the prebent suspension shown in FIG. 5.

FIGS. 7A and 7B illustrate two exemplary patches for pre-stressing a ceramic load beam.

FIG. 8 is a plan view of an integrated magnetic head, slider, prebent suspension and actuator arm of the present invention.

FIG. 9 is a side illustration of the prebent assembly shown in FIG. 8.

DETAILED DESCRIPTION OF THE PREFERRED EMBODIMENTS

Figure 1:
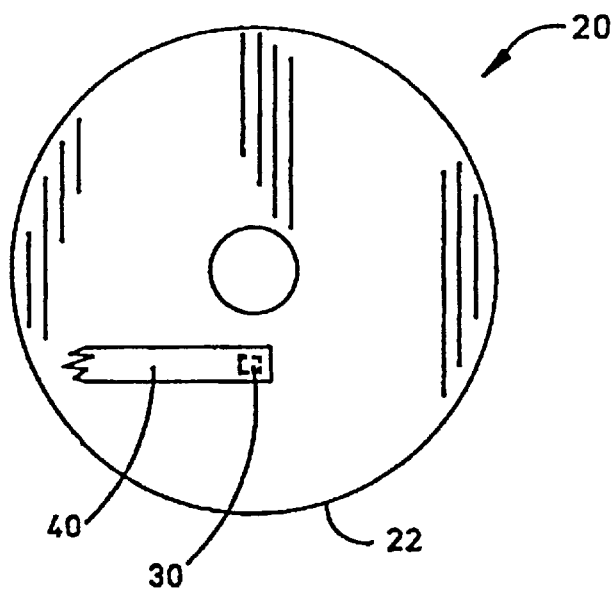
FIG. 1 is a plan view of a magnetic disk and a portion of a suspension for a magnetic disk drive.
Figure 2:
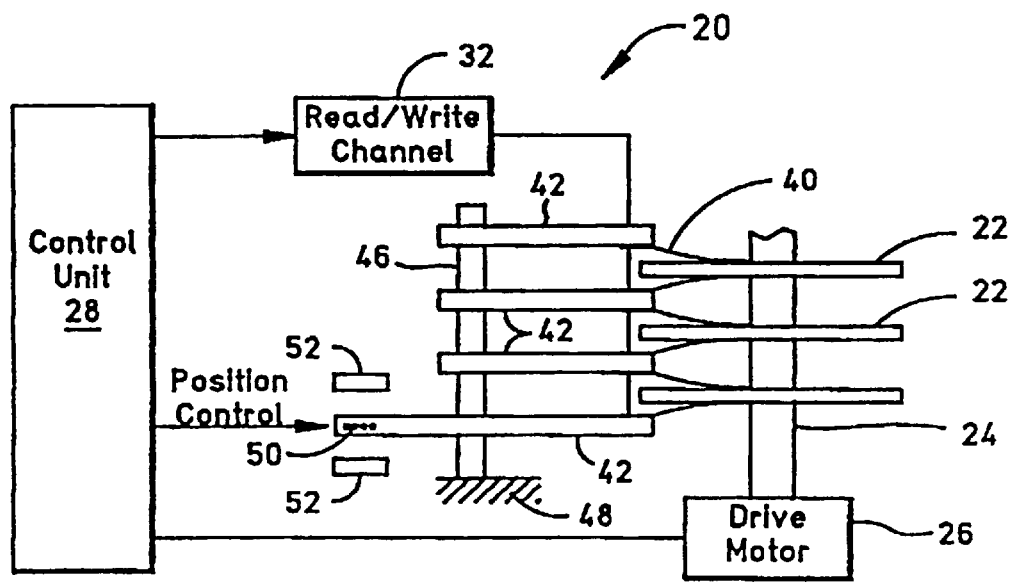
FIG. 2 is a schematic illustration of the magnetic disk drive.

Referring now to the drawings wherein like reference numerals designate like or similar parts throughout the several views. There is shown in FIGS. 1 and 2 a magnetic disk drive 20 which includes a plurality of vertically stacked double-sided magnetic disks 22. The disks are supported on and rotated by a spindle 24, the spindle being rotated by a drive motor 26 which is controlled by a control unit 28. Each side of each disk has a plurality of concentric circular tracks which are magnetically read and written by a plurality of magnetic heads, one magnetic head being shown at 30 in FIG. 1, the magnetic heads being responsive to the control unit 28 via a read/write channel 32. Each magnetic head 30 is carried by a respective end portion (slider end) of a prebent ceramic suspension 40 which is the subject of the present invention. Each ceramic prebent suspension 40 may be connected to an actuator arm 42 of an actuator with top and bottom actuator arms 42 carrying a single prebent ceramic suspension 40 and the intermediate arms carrying a pair of prebent ceramic suspensions 40. Each actuator arm 42 is fixed to a shaft 46 which is rotatably mounted in a base support 48 so that when the shaft 46 is rotated the magnetic heads at the ends of the prebent suspensions 40 move in arcs to selected circular tracks on the magnetic disks 22. One of the actuator arms 42, such as the bottom actuator arm may be provided with an extension which carries a coil 50, the coil being adjacent to permanent magnets 52 so that when the coil 50 is selectively energized the magnetic heads are positioned over selected tracks on the magnetic disks 22. The magnetic head at the end portion of the top prebent ceramic suspension on each intermediate actuator arm engages the bottom surface of a disk 22 and the magnetic head at the end portion of the bottom prebent ceramic suspension on each intermediate actuator arm engages the top surface of an adjacent magnetic disk 22. When the disks 22 are rotated swirling air between the disks and the suspensions cause each suspension to ride on a cushion of air (air bearing) with a slight spacing between the surface of the disk and the suspension, such as 0.075 microns. In some embodiments it may be desirable for the slider end of the suspension to contact the surface of the disk with minimal pressure. The prebent ceramic suspensions of the present invention provide increased disk stacking density over prior art flat ceramic suspensions and further enable integration of the magnetic head, slider, suspension and optionally the actuator arm which is not achievable by prior art metallic suspensions. These advantages will be described in more detail hereinafter.

Figure 3B:
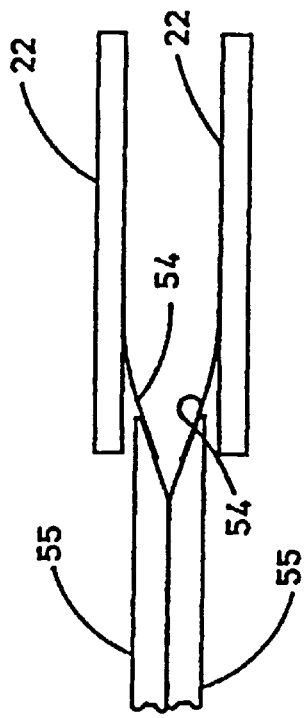
FIG. 3B is the same as FIG. 3A except the ceramic suspensions have been preloaded on magnetic disks.
Figure 3A:
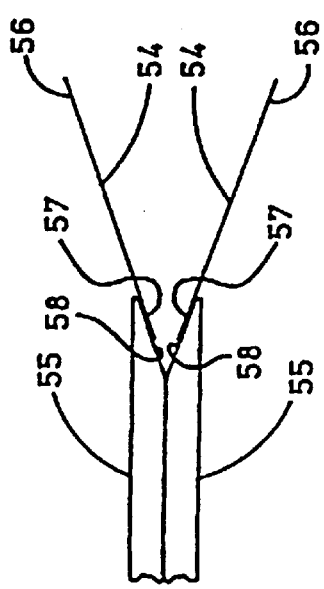
FIG. 3A is a side schematic illustration of a pair of ceramic suspensions mounted to a pair of actuator arms prior to preloading on magnetic disks.

FIG. 3A is a side view of a pair of prior art flat ceramic suspensions 54 which are connected to a pair of prior art actuator arms 55. The prior art ceramic suspensions 54 are constructed by thin film technology which is necessary in order to integrate the magnetic head components and leads with the suspension. After release from a wafer each ceramic suspension 54 is flat as shown in FIG. 3A. In order to obtain preloading of the slider ends 56 of the ceramic suspensions against surfaces of adjacent disks each suspension must be angled toward a respective disk as shown in FIG. 3A. This is achieved by attaching an end portion 57 of each suspension to an angled surface 58 on each actuator arm 55. FIG. 3B shows the prior art ceramic suspensions 54 preloaded on a pair of magnetic disks 22.

Figure 4B:
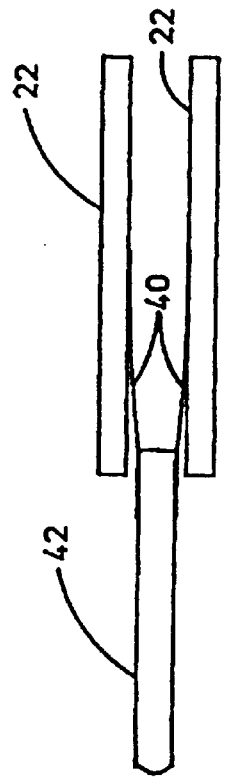
FIG. 4B is the same as FIG. 4A except the prebent ceramic suspensions have been preloaded on magnetic disks.
Figure 4A:
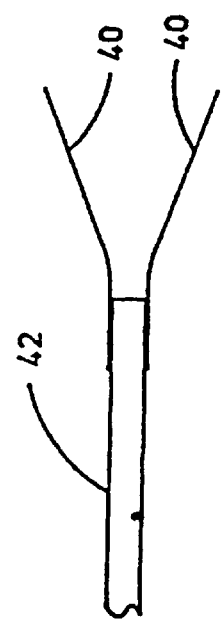
FIG. 4A is a side schematic illustration of the present prebent ceramic suspensions mounted on a single actuator arm prior to preloading on magnetic disks.

FIG. 4A shows a side view of a pair of the present prebent ceramic suspensions 40. Since the prebent ceramic suspensions 40 are already bent they can be mounted on a single actuator arm 42. FIG. 4B shows the prebent ceramic suspensions 40 preloaded on top and bottom adjacent magnetic disks 22. With the present intention, disk stacking density is increased over disk stacking density of prior art ceramic suspensions 54. This is because one actuator arm 42 carries two prebent suspensions 40 whereas in the prior art each actuator arm 55 carries only one prior art suspension 54. There is another reason for increased disk stacking density which will be explained in detail hereinafter. Further, magnetic disk drives, which employ prebent suspensions, use less actuator arms which reduces weight and cost.

FIG. 5 shows an exemplary prebent integrated ceramic suspension 60 which integrates a load beam 61 with a slider at 62, a magnetic head 64 and leads 66 and 68 which interconnect components of the magnetic head to pads 70. As will be explained in more detail hereinafter, a patch 80 of compressive material is employed for bending the suspension. The preferred lateral shape of the patch is trapezoidal which provides an advantage which will be described in more detail hereinafter. It is preferred that the patch and consequently the bending be located closer to the end of the load beam opposite the magnetic head 64 so as to increase the moment arm upon preloading. The trapezoidal patch is shown also in FIG. 7A and a rectangular patch 82 is shown in FIG. 7B. The compressive patch 80 exerts a compressive force on the top surface of the ceramic suspension which causes the ceramic suspension to bend to provide the desired preloading. The patches in FIGS. 7A and 7B were employed in various embodiments to illustrate the bending of the ceramic suspension. FIG. 6 shows a side view of the ceramic suspension of FIG. 5 being bent by the patch 80 to provide a desired preloading. The slider 62 is a bottom end portion of the suspension. The slider 62 is supported by the air bearing against the bending force of the suspension upon rotation of the magnetic disk.

In the preferred embodiment the beam 61 has a reduced cross-section across its width which provides a recess 69 for receiving the patch 80. When the suspension is preloaded on a disk practically all of the bending will take place at the reduced cross-section. This causes the remainder of the suspension toward the magnetic head to assume a flatter configuration upon preloading on a disk. The flatter configuration takes up less vertical space and is a second factor which increases disk stacking density.

In FIGS. 8 and 9 there is shown an integrated magnetic head-slider-suspension-actuator arm 90. In this embodiment an actuator arm portion 92 may include the pads 70, an opening 94 for receiving the shaft 46, shown in FIG. 2, and the coil 50 which is also shown in FIG. 2. The compressive patch 80 is shown in the recess 69 of the suspension portion adjacent the actuator arm portion 92. A side view of the prebent integrated assembly is shown in FIG. 9. In an actual embodiment of the integrated assembly 90 the actuator arm portion 42 would be about twice as wide and would be supported by a metal plate.

Figure 10:
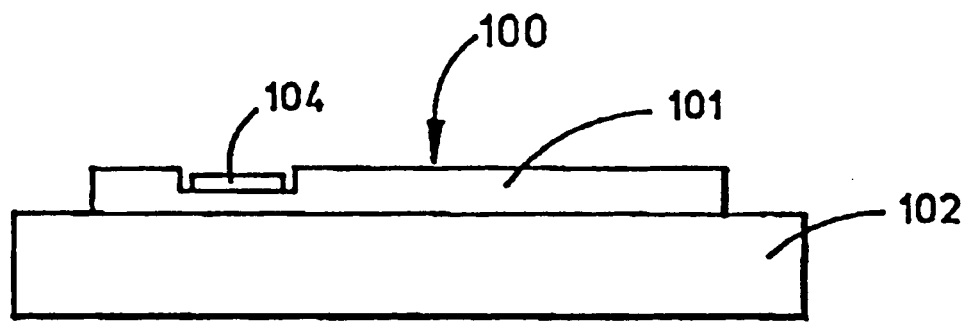
FIG. 10 is a side schematic illustration of the construction of the ceramic load beam and compressive patch on the substrate.
Figure 11:
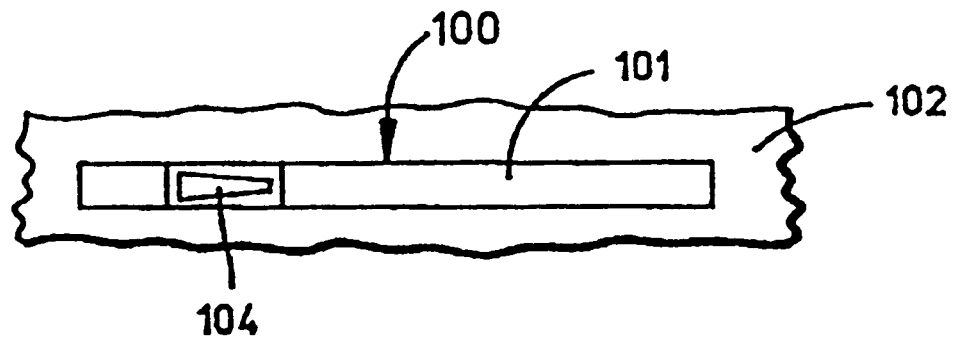
FIG. 11 is a top plan illustration of FIG. 10.
Figure 12:
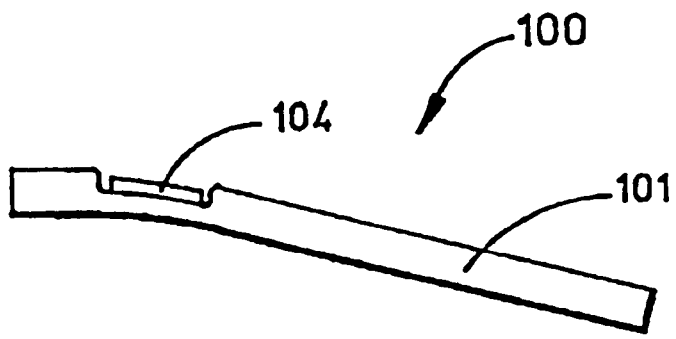
FIG. 12 is a side illustration of the prebent suspension after release from the substrate.

FIGS. 10–13 describe the method of making the prebent ceramic suspension 60 or 90 at 100. FIG. 10 shows a load beam 101 formed on a substrate 102. The substrate 102 may be a wafer which supports the construction of literally hundreds of ceramic suspensions. The load beam is made of any suitable ceramic material such as alumina ($AL_2O_3$). A patch 104 of stressed material applies a force on the top surface of the load beam immediately below the patch. This patch can be made of compressive material. The preferred material is amorphous hydrogenated diamond-like carbon (DLC). Other suitable materials are amorphous carbon or amorphous diamond. A top view of a single ceramic load beam and compressive patch on the substrate is illustrated in FIG. 11. When the suspension 100 is released from the substrate, the compressive patch 104 expands to apply tensile forces to the top surface of the ceramic load beam immediately below the patch. This causes the ceramic load beam to bend as shown in FIG. 12. It should be understood that the suspension 100 is intended to represent an integrated magnetic head-slider-suspension 60 as shown in FIG. 5 or an integrated magnetic head-slider-suspension actuator arm 90 as shown in FIG. 8.

Figure 13:
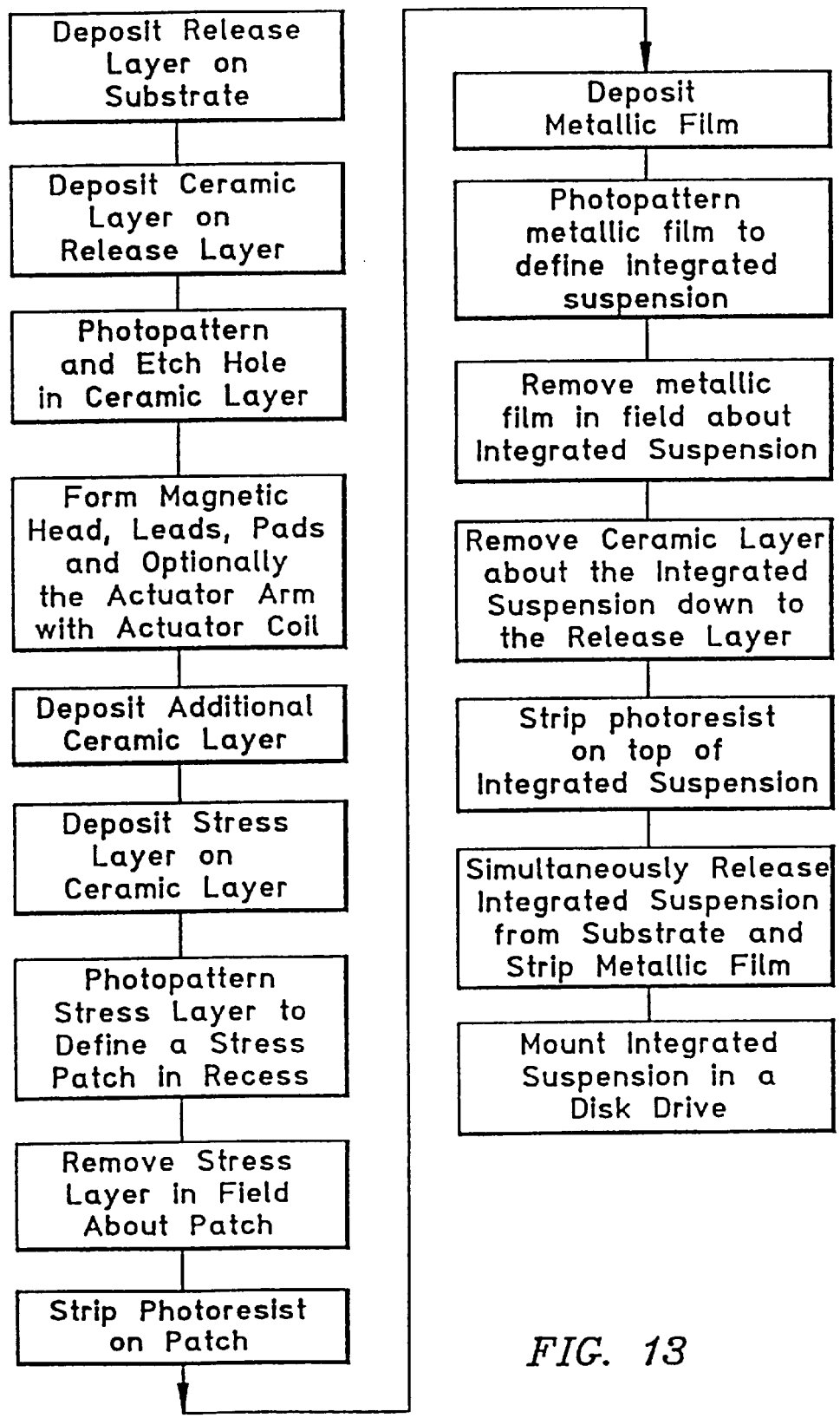
FIG. 13 is a block diagram of exemplary process steps for constructing the prebent suspension.

A detailed method of making the integrated suspension is shown in block diagram in FIG. 13. Thin film techniques are employed which include electroplating, sputtering, plasma-assisted chemical vapor deposition (PACVD) and photopatterning with photoresist. As shown in FIG. 13, the first step is to deposit a release layer on the substrate. The release layer, which may be copper, is employed for releasing the ceramic suspensions later in the construction. The next step is to deposit a ceramic layer on the release layer. The ceramic layer is non-ductile and is preferably alumina. The ceramic layer, which may be about 10 $\mu$m thick, is then provided with a hole by photopatterning arid etching. This hole will cause the recess 69 (See FIGS. 6 and 9) when a subsequent ceramic layer is deposited. During formation of the ceramic layer or layers, the magnetic head, leads, pads, and optionally, an actuator arm with an actuator coil may be fabricated. With these steps, the stage is set for an integrated magnetic head-slider-suspension 60 as shown in FIG. 5 or an integrated magnetic head-slider-suspension-actuator arm 90 as shown in FIG. 8. A final or additional ceramic layer, which may be 20 $\mu$m thick, is deposited which fills the hole of the first ceramic layer and provides the recess 69. The ceramic layers may be formed by sputtering and the components for the magnetic head, leads, pads and actuator coil may be formed by plating and sputtering along with photopatterning.

The next step is to deposit a stress layer on the ceramic layer. The stress layer is preferably a compression layer of amorphous, hydrogenated, diamond-like carbon. This may be accomplished by a variety of beam-assisted methods, such as plasma-assisted chemical vapor deposition (PACVD), sputtering, ion beam, cathodic arc, or laser deposition techniques. The preferred techniques are radio frequency plasma-assisted chemical vapor deposition (RF PACVD) or direct current plasma-assisted chemical vapor deposition (DC PACVD). PACVD is conducted in a chamber which has parallel plate electrodes, one of the electrodes being positive and the other electrode being negative. The substrate is connected to the negative electrode and radio frequency or DC current is passed therebetween. DC current is employed when the ceramic layer is on a conductive layer such as the copper release layer. RF current is employed when the current must penetrate insulation layers to the negative electrode. A precursor, which contains carbon and hydrogen such as acetylene, methane, and cyclohexane, is employed in the chamber. By using the various deposition techniques, precursors, temperatures and pressures various compressive stresses can be developed within the amorphous hydrogenated diamond-like carbon layer. Tests which were run to show the various compressive stresses are set forth in the following four examples:

EXAMPLE 1

Deposition by RF PACVD

Precursor=acetylene

Pressure=30 mtorr

RF power density=150 mW.cm$^{-2}$

Substrate temperature=180° C.

Substrate bias=−150 V DC (substrate positioned on powered electrode)

Obtained stress=1.6 GPa, compressive

EXAMPLE 2

Deposition by RF PACVD

Precursor=acetylene

Pressure=30 mtorr

RF power density=100 mW.cm$^{-2}$

Substrate temperature=180° C.

Substrate bias=−80 V DC (substrate positioned on powered electrode)

Obtained stress=1.25 GPa, compressive

EXAMPLE 3

Deposition by DC PACVD

Precursor=methane

Pressure=100 mtorr

DC bias=−800 V

Substrate temperature=180° C.

Substrate bias=−800 V DC

Obtained stress=1.4 GPa, compressive

EXAMPLE 4

Deposition by DC PACVD

Precursor=cyclohexane

Pressure=100 mtorr

DC bias=−800 V

Substrate temperature=180° C.

Substrate bias=−800 V DC

Obtained stress=0.65 GPa. compressive

When current is passed between the electrodes the precursor gas ionizes and charged carbon ions attack the negative electrode which results in deposition of the amorphous hydrogenated diamond-like carbon on the substrate target. The above stresses can further be controlled by doping the precursor with hydrogen, nitrogen, fluorine, silicon or a combination thereof. The precursor is a hydrocarbon so that doping with hydrogen will generally increase the stress while doping with nitrogen will generally decrease the stress.

The construction and stress results of forming diamond-like carbon films by RF PACVD and DC PACVD are explained in the following published articles:

1. "Diamondlike carbon films by rf plasma-assisted chemical vapor deposition from acetylene" in *IBM Journal of Research and Development*, Vol. 34, No. 6, November 1990, by Grill, Meyerson and Patel;
2. "The Effect of Deposition Conditions or the Optical and Tribological Properties of Annealed Diamond-Like Carbons Films" in R. E. Clausing, L. L. Horton, J. C. Angus and P. Koidl (eds.), *Diamond and Diamond-Like Films and Coatings*, NATO-ASI Series B; Physics. Plenum, New York, 1991, Vol. 266, p. 417 by Grill, Patel and Meyerson;
3. "Diamondlike Carbon Deposited by DC PACVD" in *Diamond Films and Technology*, Vol 1, No. 4, 1992, by Grill and Patel;
4. "Nitrogen-Containing Diamondlike Carbon Prepared by DC PACVD" in *Diamond Films and Technology*, Vol 2, Nos. 2 and 3, 1992, by Grill and Patel; and
5. "Stresses in diamond-like carbon films" in *Diamond and Related Materials*, 2 (1993), by Grill and Patel.

The next step is to photopattern the stress layer to define a patch area of the stress layer. This is an important step since the photopatterning establishes the stress which will be applied to the ceramic load beam immediately below the patch. Examples of two shapes of the patches are shown in FIGS. 7A and 7B. The preferred shape of the patch is trapezoidal as shown in FIG. 7A. The trapezoidal patch is bounded by short and long parallel edges and a pair of tapered edges. The patch in FIG. 7A progressively increases in cross-section from its short edge to its long edge. With the trapezoidal patch, the stress applied to the ceramic layer immediately under the patch progressively increases from the short edge of the patch to the long edge of the patch. Otherwise, the compressive stress along the longitudinal axis of the suspension beneath the trapezoidal patch is not constant whereas the compressive stress due to the rectangular patch shown in FIG. 7B is constant. By properly designing the lateral area and thickness of the trapezoidal patch, shown in FIG. 7A, the stress on the ceramic load beam immediately beneath the patch can be made to be constant upon preloading the suspension on a disk because of the varying moment arm of the suspension. With this arrangement the load beam below the trapezoidal patch is an arc of a circle. This greatly facilitates the design of the suspension for a desired preloading.

The next step is to remove the stress layer in the field about the patch. This may be accomplished by etching, such as reactive ion etching (RIE). The next step is to strip the photoresist which covers the patch. The next step is to deposit a metallic film, such as chromium, over the entire wafer. The thickness of the chromium film may be in the order of 1,000 to 2,000 Å. The next step is to photopattern the metallic film to define an integrated suspension. The next step is to remove the metallic film in the field about the integrated suspension. This leaves photoresist on top of the metallic film which is on top of the desired configuration for the integrated suspension. The next step is to remove the ceramic layer in the field about the integrated suspension down to the release layer which forms an integrated suspension which is attached to the release layer. The next step is to strip the photoresist layer on top of the integrated suspension. The next step is to simultaneously release the integrated suspension from the substrate and strip the metallic film. This may be accomplished with a dissolvant which attacks both the release film and the metallic film. This step provides the completed integrated suspension. When multiple suspensions are being formed on a wafer the photopatterning is employed to pattern each of the suspensions.

The suspension can then be affixed by bonding to an actuator arm or if the integrated suspension is integrated with the actuator arm, the actuator arm is mounted in the actuator assembly.

It should be understood that preloading a ceramic suspension on a disk must be precise. Accordingly, the angled ends 58 of the actuator arms 55, shown in FIGS. 3A and 3B, must be within a tolerance of a few microradians. Since these angled surfaces are machined, this is a difficult tolerance to maintain. The result is unreliable preloading by this type of ceramic suspension. This is not a problem with the prebent suspension since the pre-bending can be accurately controlled by thin film construction. The prebent ceramic suspension, which has a reduced cross-section at the location of the patch, has an added advantage in that the magnetic head or slider end of the ceramic suspension gets flatter quicker with respect to the magnetic disk than the prior art ceramic suspension. Accordingly, the stacking density of disk drives employing the prebent suspensions is greater than disk drives which employ the prior art ceramic suspensions. Another advantage of the prebent suspension is that it can be altered after construction by annealing or trimming the patch above 400° C. with heat such as a laser beam or an infrared beam. For instance, if the stress is too great on the ceramic beam, portions of the patch can be hit with a laser beam which will effectively nullify the stress of the hit portions.

Figure 14:
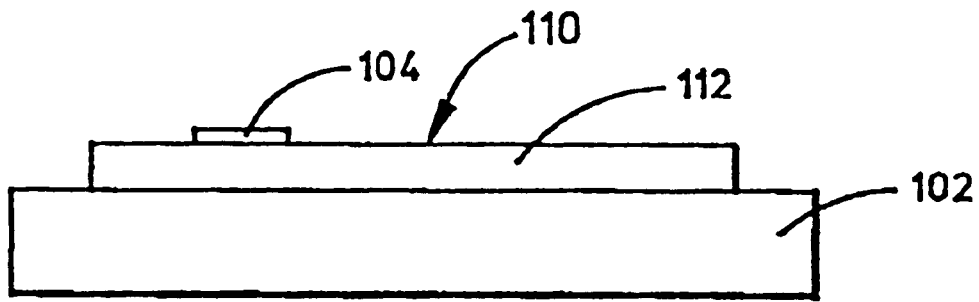
FIGS. 14–16 illustrate another embodiment of the invention which omits a recess for receiving the patch.
Figure 15:
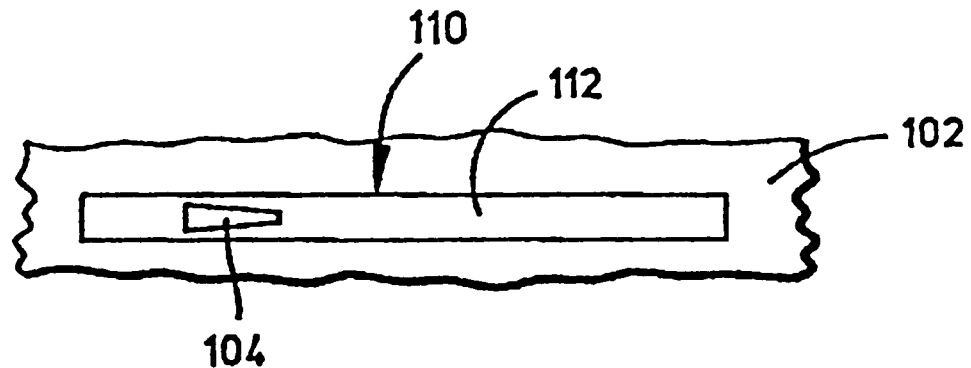
Figure 16:
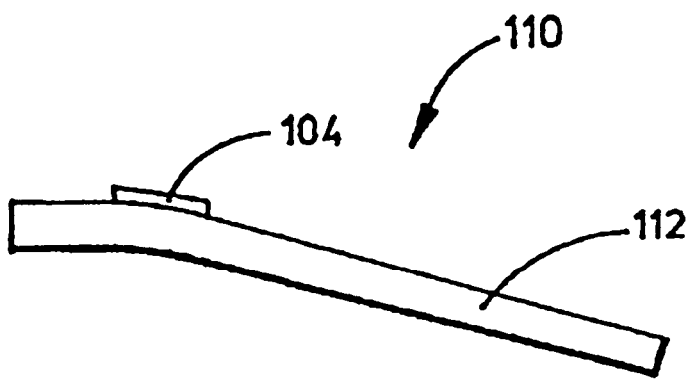

Another ceramic suspension 110 is shown in FIGS. 14–16 wherein the load beam 112 does not have s recess for the patch 80. Calculations were made for this suspension without the integrated components. The ceramic suspension was 12 mm long with a 0.9 mm width and 1 mm long with a 1 mm width, these widths being shown in FIG. 5. The thickness of the suspension was 26 $\mu$m. The trapezoidal patch 80 was 1-½ mm long, the short edge was 0.24 mm long, the long edge was 0.3 mm long and the thickness was 0.7 mm. The material of the suspension was alumina and the material of the patch was amorphous hydrogenated diamond-like carbon.

Calculations for the prebent ceramic suspension are set forth hereinbelow. The calculations first compute the residual stress in the alumina/DLC sandwich before it is released from the substrate. Once released from the substrate, the stress will redistribute, as will the strain. From a calculation of the new stress distribution, one can determine how much of the strain is extensional, and how much goes into bending. This bending strain then can be used to compute the deflection angles and deflected position of the beam. Throughout the calculations, one dimensional beam theory is used. For accuracy the deformation of the alumina/DLC system in the width direction should be small; otherwise, anticlastic curvature could result (i.e. the beam would bend like a tape measure), and the beam tip will deflect much less. Therefore, the width of the patch should be kept to less than half the width of the beam. The stress distribution through the thickness of the beam is given by:

$$\sigma(z) = \sigma_r(z) + E(z) \cdot \epsilon(z)$$

where the first term on the right hand side is a residual stress, and the second is the deformation produced by the overall stress state. For convenience it is assumed that the stress out of the plane of the centerline of the beam is not important. The strain is assumed to be of the form $$\epsilon(z) = \epsilon_0 + \epsilon_1 \cdot z$$

where the terms on the right hand side are respectively the constant longitudinal extension of the beam and a linearly varying strain term. The sought after term is the linearly varying strain term since it will provide the beam curvature, which will in turn provide how much moment is required to straighten out the beam. Substitution of the second equation into the first gives:

$$\sigma(z) = \sigma_r(z) + E(z) \cdot (\epsilon_0 + \epsilon_1 \cdot Z)$$

To compute the forces and moments on the beam the above expression is integrated. The longitudinal force is given by $$T_x = \int_A \sigma(z) dA$$

while the moment is given by $$M_y = \int_A z \cdot \sigma(z) dA$$

The force and moment conditions on the beam after the Alumina/DLC structure has been released from the substrate are $$T_x = 0 \text{ and } M_y = 0$$

The residual stresses are $$\sigma_r = \sigma_{DLC} \text{ in diamond like carbon coating}$$

$$\sigma_r 0 \text{ in alumina layer}$$

The alumina and DLC will be assumed to have rectangular cross sections; they do not however need to have the same widths. In fact, it will probably be beneficial in reducing the lateral warpage if the DLC is less than half the width of the beam. The alumina is taken to extend from $h_1$ to $h_2$, with width $W_A$, while the DLC extends from $h_2$ to $h_3$ with a width $W_{DLC}$. In general, both the thicknesses h and the widths of both the alumina and the DLC are functions of the position along the length of the beam. Integration of the force condition gives the constant strain term in terms of the linear term as $$\epsilon_0 \alpha \cdot \epsilon_1 + \beta$$

where $$\alpha = \frac{E_A \cdot \frac{w_A}{2} \cdot (h_2^2 - h_1^2) + E_{DLC} \cdot \frac{w_{DLC}}{2} \cdot (h_3^2 - h_2^2)}{-[E_A \cdot w_A \cdot (h_2 - h_1) + E_{DLC} \cdot w_{DLC} \cdot (h_3 - h_2)]}$$

$$\beta = \frac{w_{DLC} \cdot \sigma_{DLC} \cdot (h_3 - h_2)}{-[E_A \cdot w_A \cdot (h_2 - h_1) + E_{DLC} \cdot w_{DLC} \cdot (h_3 - h_2)]}$$

Integration of the moment condition produces the relation $$\psi \cdot \epsilon_1 + \gamma \cdot \epsilon_0 \delta = 0$$

where $$\psi = \frac{E_A \cdot w_A}{3} \cdot (h_2^3 - h_1^3) + \frac{E_{DLC} \cdot w_{DLC}}{3} \cdot (h_3^3 - h_2^3)$$

$$\gamma = \frac{E_A \cdot w_A}{2} \cdot (h_2^2 - h_1^2) + \frac{E_{DLC} \cdot w_{DLC}}{2} \cdot (h_3^2 - h_2^2)$$

$$\delta = w_{DLC} \cdot \sigma_{DLC} \cdot (h_3^2 - h_2^2)$$

When these expressions are combined with the one resulting from the force condition, solving for the linear strain term gives:

$$\varepsilon_1 = -\frac{\gamma \cdot \beta + \delta}{\psi + \gamma \cdot \alpha}$$

This term is the curvature of the beam. From beam theory, the slope of a point along the beam length is $$\theta(x) = \int_0^x \varepsilon_1(y) \, dy$$

where the curvature is permitted to be a function of position along the beam. This would be the case if any of the material properties or dimensions of either the ceramic or the compressive layer were to vary along the beam length. The deflection along the beam is found through $$u(x) = \int_0^x \int_0^y \varepsilon_1(s) \, ds \, dy$$

The tip deflection is given by $$u(L) = \int_0^L \int_0^y \varepsilon_1(x) \, dx \, dy$$

In the ensuing analysis the compressive patch has a trapezoidal shape and the beam is rectangular and that the cross sections of both are rectangular. Then, the shape of the compressive patch is given by $$w_{DLC}(x) = w_{DLC1} + \frac{x}{L_{DLC}} \cdot (w_{DLC2} - w_{DLC1})$$

where the DLC patch starts at x=0 and extends to LDLC, with widths $W_{DLC1}$ and $W_{DLC2}$, respectively. The following values are assumed to calculate angle of beam tip θ(L) and beam tip deflection u(L) in conjunction with the following formulas:

$E_A := 70 \cdot 10^9 \cdot Pa$ ... Young's modulus of alumina $E_{DLC} := 170 \cdot 10^9 \cdot Pa$ ... Young's modulus of diamond like carbon (DLC)

$\sigma_{DLC} := 650 \cdot 10^6 \cdot Pa$ ... compressive stress in DLC $w_A := 0.6 \cdot 10^{-3} \cdot m$ ... width of alumina beam $h_1 := 0 \cdot m$ ... coordinate of bottom beam $h_2 := 20 \cdot 10^{-6} \cdot m$ ... thickness of alumina $h_3 := 20.7 \cdot 10^{-6} \cdot m$ ... thickness of alumina plus DLC $h_3 - h_2 = 7 \cdot 10^{-7} \cdot m$ ... DLC thickness $L := 10 \cdot mm$ ... beam free length (does not include attachment area at base)

$w_{DLC1} := 0.3 \cdot mm$ ... width of DLC at base of alumina beam $w_{DLC2} := 0.24 \cdot mm$ ... width of DLC at tip of patch $L_{DLC} := 1.5 \cdot mm$ ... length of DLC patch $$w_{DLC}(x) := w_{DLC1} + \frac{x}{L_{DLC}} \cdot (w_{DLC2} - w_{DLC1})$$

$$\psi(x) := \frac{E_A \cdot w_A}{3} \cdot (h_2^3 - h_1^3) + \frac{E_{DLC} \cdot w_{DLC}(x)}{3} \cdot (h_3^3 - h_2^3)$$

$$\gamma(x) := \frac{E_A \cdot w_A}{2} \cdot (h_2^2 - h_1^2) + \frac{E_{DLC} \cdot w_{DLC}(x)}{2} \cdot (h_3^2 - h_2^2)$$

$$\delta(x) := w_{DLC}(x) \cdot \sigma_{DLC} \cdot (h_3^2 - h_2^2)$$

$$\alpha(x) := \frac{E_A \cdot \frac{w_A}{2} \cdot (h_2^2 - h_1^2) + E_{DLC} \cdot \frac{w_{DLC}(x)}{2} \cdot (h_3^2 - h_2^2)}{-[E_A \cdot w_A \cdot (h_2 - h_1) + E_{DLC} \cdot w_{DLC}(x) \cdot (h_3 - h_2)]}$$

$$\beta(x) := \frac{w_{DLC}(x) \cdot \sigma_{DLC} \cdot (h_3 - h_2)}{-[E_A \cdot w_A \cdot (h_2 - h_1) + E_{DLC} \cdot w_{DLC}(x) \cdot (h_3 - h_2)]}$$

$$\varepsilon_1(x) := \text{if}\left(x < L_{DLC}, -\frac{\gamma(x) \cdot \beta(x) + \delta(x)}{\psi(x) + \gamma(x) \cdot \alpha(x)}, 0 \cdot m^{-1}\right) \quad \text{... area of beam that is curved is that where } x < L_{DLC};$$
otherwise curvature is zero.

$$\theta(x) := \int_{0 \cdot mm}^{x} \varepsilon_1(s) \, ds \qquad \text{... beam angle}$$

$$u(s) := \int_{0 \cdot mm}^{s} \int_{0 \cdot mm}^{y} \varepsilon_1(x) \, dx \, dy \qquad \text{... beam deflection}$$

$$\theta(L) = -0.178 \qquad \text{... angle of beam tip (in radians)}$$

$$u(L) = -1.655 \cdot mm \qquad \text{... beam tip deflection}$$

The final suspension shape is given by the sum of the shape due to the tip loading and the initial curved shape produced by the pre-bending patch. Since the strain is small and the deformation angles are moderate it is assumed that linear superposition holds.

The deformation of a cantilever beam with a concentrated load at its tip is given by:

$$\theta_1 = \frac{W \cdot l^2}{2 \cdot E \cdot I}$$

$$u_1 = \frac{W \cdot l^3}{3 \cdot E \cdot I}$$

which is referenced in Roark, R., and Young, W., *Formulas for Stress and Strain*, 5th edition. p. 96. From the first of the above expressions, the load required to deflect the suspension through a given angle is $$W = \frac{2 \cdot E \cdot I \cdot \theta_1}{l^2}$$

In the ensuing calculations the effect of the prebend patch on the stiffness of the suspension is ignored since for a thin patch the change in stiffness will be less than a few percent. A suspension is desired in which both the base and the head are at the same angle. With the following values and formulas the load W which neutralizes the end rotation produced by the prebending can be determined.

$$\theta_1 := 0.178 \qquad \text{... tip angle for prebent suspension}$$

$$E_A := 70 \cdot 10^9 \cdot Pa \qquad \text{... Young's modulus for alumina}$$

$$h_1 := 0 \cdot m \qquad \text{... bottom position of thickness}$$

$$h_2 := 20 \cdot 10^{-6} \cdot m \qquad \text{... Alumina thickness}$$

$$w_A := 0.6 \cdot 10^{-3} \cdot m \qquad \text{... Alumina width}$$

$$I := \frac{w_A \cdot (h_2 - h_1)^3}{12} \qquad \text{... moment of inertia for Alumina beam}$$

$$L := 10 \cdot mm \qquad \text{... Alumina beam length}$$

The load required is $$W := \frac{2 \cdot E_A \cdot L \cdot \theta_1}{L^2}$$

$$W = 9.968 \cdot 10^{-5} \cdot \text{newton (approx. 0.1 gm)}$$

The difference in position between top surfaces at the base and the tip of the suspension is found by subtracting the deflection caused by this loading from the deflection produced by the prebending of the part. This is given by $$u_{total} = u(L) - u_1$$

$$u_{total} := -1.655 \cdot mm - \frac{-W \cdot L^3}{3 \cdot E_A \cdot L}$$

$$u_{total} := -0.468 \cdot mm$$

It is obvious from the above calculations that the stress applied by the patch to the ceramic suspension can be accurately controlled to provide a precise preloading.

Obviously, other embodiments and modifications of the invention will occur to those of ordinary skill in the art in view of the above teachings. Therefore, the invention is to be limited only by the following claims which include all such embodiments and modifications when view in conjunction with the above specification and accompanying drawings.

We claim:

1. A prebent ceramic suspension for a magnetic disk drive comprising:

an elongated ceramic load beam which has first and second surfaces which are bounded by first and second ends and first and second sides, the beam having a longitudinal axis which extends between the first and second ends;

a patch of stressed material on the first surface of the beam which stresses the first surface and causes the beam to bend.

2. A magnetic disk drive including a pair of suspensions as claimed in claim 1 including:

an actuator which has an actuator arm;

said pair of suspensions being mounted at first ends to the actuator arm;

a magnetic disk mounted on a rotatable spindle; and second ends of said pair of suspensions being preloaded on surfaces of adjacent magnetic disks.

3. A combined suspension and actuator arm which includes first and second suspensions as claimed in claim 1 comprising:

each suspension having first and second end portions;

an actuator arm having top and bottom surfaces;

the first end portions of the first and second suspensions being connected to the top and bottom surfaces respectively of the actuator arm with the second end portions of the first and second suspensions extending therefrom.

4. A suspension as claimed in claim 1 wherein the load beam has a recess which receives the patch.

5. A suspension as claimed in claim 1 wherein the bend in the load beam provides preloading of the load beam on a magnetic disk.

6. A suspension as claimed in claim 1 wherein the load beam is alumina.

7. A suspension as claimed in claim 1 including:

the patch being located at a first end portion of the load beam; and a magnetic head located at a second end portion of the load beam.

* * * * *